United States Patent
Liu et al.

(10) Patent No.: US 12,313,864 B2
(45) Date of Patent: May 27, 2025

(54) HIGH TRANSMISSION LIGHT CONTROL FILM COMPRISING ALTERNATING TRANSMISSIVE AND ABSORPTIVE REGIONS

(71) Applicant: 3M INNOVATIVE PROPERTIES COMPANY, St. Paul, MN (US)

(72) Inventors: Tao Liu, Woodbury, MN (US); Nicholas A. Johnson, Woodbury, MN (US); Raymond J. Kenney, Woodbury, MN (US); Caleb T. Nelson, McKinney, TX (US); Daniel J. Schmidt, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 525 days.

(21) Appl. No.: 17/757,743

(22) PCT Filed: Dec. 18, 2020

(86) PCT No.: PCT/IB2020/062226
§ 371 (c)(1),
(2) Date: Jun. 20, 2022

(87) PCT Pub. No.: WO2021/130637
PCT Pub. Date: Jul. 1, 2021

(65) Prior Publication Data
US 2023/0028958 A1    Jan. 26, 2023

Related U.S. Application Data

(60) Provisional application No. 62/952,755, filed on Dec. 23, 2019.

(51) Int. Cl.
G02B 5/00    (2006.01)
G02B 1/04    (2006.01)
(Continued)

(52) U.S. Cl.
CPC ............... *G02B 5/003* (2013.01); *G02B 1/04* (2013.01); *G02B 5/28* (2013.01); *G02B 5/3033* (2013.01)

(58) Field of Classification Search
CPC ............. G02B 2207/123; G02F 1/1365; G02F 2203/24
See application file for complete search history.

(56) References Cited

U.S. PATENT DOCUMENTS 4,601,861 A    7/1986  Pricone et al.
5,486,949 A    1/1996  Schrenk et al.
(Continued)

FOREIGN PATENT DOCUMENTS

EP    0893713 A2    1/1999
JP    S63319140 A   12/1988
(Continued)

OTHER PUBLICATIONS

International Search Report for PCT Application No. PCT/IB2020/062226 mailed on May 21, 2021, 3 pages.

*Primary Examiner* — Paul C Lee
(74) *Attorney, Agent, or Firm* — Jonathan L. Tolstedt

(57) ABSTRACT

A light control film comprises a light input surface and a light output surface; alternating transmissive regions and absorptive regions disposed between the light input surface and the light output surface; and TIR cladding layers. The TIR cladding layer having a refractive index, $n_{TIR}$. The transmissive regions alternate between high refractive index transmissive regions having a refractive index, $n_2$, and low refractive index transmissive regions having a refractive index, $n_1$. The absorptive regions comprise a core having a refractive index, $n_{core}$, adjacent an AR cladding layer; wherein $n_1 < n_2$ and $n_{TIR} < n_2$. The TIR cladding layers are adjacent the high refractive index transmissive regions. The (Continued)

cores have an aspect ratio of at least 20. The high refractive index transmissive regions have a wall angle of 6 degrees or less.

20 Claims, 5 Drawing Sheets

(51) Int. Cl.
  *G02B 5/28* (2006.01)
  *G02B 5/30* (2006.01)

(56) References Cited

U.S. PATENT DOCUMENTS

| | | | |
|---|---|---|---|
| 5,612,820 A | 3/1997 | Schrenk et al. | |
| 5,783,120 A | 7/1998 | Ouderkirk et al. | |
| 5,825,543 A | 10/1998 | Ouderkirk et al. | |
| 5,828,488 A | 10/1998 | Ouderkirk et al. | |
| 5,882,774 A | 3/1999 | Jonza et al. | |
| 6,111,696 A | 8/2000 | Allen et al. | |
| 6,398,370 B1 * | 6/2002 | Chiu | G02B 5/003 428/167 |
| 6,531,230 B1 | 3/2003 | Weber et al. | |
| 6,832,037 B2 | 12/2004 | Aylward et al. | |
| 7,018,713 B2 | 3/2006 | Padiyath et al. | |
| 7,140,741 B2 | 11/2006 | Fleming et al. | |
| 7,173,778 B2 | 2/2007 | Jing et al. | |
| 7,267,850 B2 | 9/2007 | Coggio et al. | |
| 7,486,019 B2 | 2/2009 | Padiyath et al. | |
| 7,575,847 B2 | 8/2009 | Jing et al. | |
| 8,012,567 B2 | 9/2011 | Gaides et al. | |
| 8,213,082 B2 | 7/2012 | Gaides et al. | |
| 8,234,998 B2 | 8/2012 | Krogman et al. | |
| 8,313,798 B2 | 11/2012 | Nogueira et al. | |
| 8,460,568 B2 | 6/2013 | David et al. | |
| 8,503,122 B2 | 8/2013 | Liu et al. | |
| 9,335,449 B2 | 5/2016 | Gaides et al. | |
| 9,360,509 B2 | 6/2016 | Naughton et al. | |
| 2005/0128579 A1 | 6/2005 | Thomas et al. | |
| 2006/0158724 A1 * | 7/2006 | Thomas | B29C 70/745 359/443 |
| 2007/0160811 A1 | 7/2007 | Gaides et al. | |
| 2007/0218261 A1 | 9/2007 | Saitoh | |
| 2010/0046105 A1 | 2/2010 | Chun | |
| 2011/0064936 A1 | 3/2011 | Cunningham et al. | |
| 2014/0204464 A1 | 7/2014 | Halverson et al. | |
| 2019/0212490 A1 | 7/2019 | Tien | |

FOREIGN PATENT DOCUMENTS

| | | | |
|---|---|---|---|
| JP | H09311206 A | 12/1997 | |
| JP | 2008185767 A | 8/2008 | |
| WO | 1992011549 A1 | 7/1992 | |
| WO | 2006025956 A1 | 3/2006 | |
| WO | 2006025992 A1 | 3/2006 | |
| WO | 2006102383 A1 | 9/2006 | |
| WO | 2015095317 A1 | 6/2015 | |
| WO | WO-2019118685 A1 * | 6/2019 | G02B 5/003 |

\* cited by examiner

HIGH TRANSMISSION LIGHT CONTROL FILM COMPRISING ALTERNATING TRANSMISSIVE AND ABSORPTIVE REGIONS

CROSS REFERENCE TO RELATED APPLICATIONS

This application is a national stage filing under 35U.S.C. 371 of PCT/IB2020/062226, filed Dec. 18, 2020, which claims the benefit of U.S. Provisional Patent Application No. 62/952,755, filed Dec. 23, 2019, the disclosure of which is incorporated by reference in its/their entirety herein.

FIELD

This invention relates to light control films and methods of making the light control films.

BACKGROUND

Louver-based light control films for applications such as privacy filters and automotive display filters have traditionally been made by skiving processes, microreplication or cast-and-cure processes. A limitation of traditional louver-based light control films is that on-axis light transmission is limited because of the louver aspect ratios, which are typically about 10:1 to about 15:1.

Recently, methods for making higher aspect ratio light control films have been developed, e.g., in WO 2019/118685. The resulting light control films can obtain much higher on-axis light transmission.

SUMMARY

We have recognized the need in the art for high aspect ratio, high transmission louver films that also have improved "top-hat" performance, i.e., the axial brightness of light passing through the film is increased and the brightness is more uniform within the viewing angle, and the viewing cutoff angle is sharpened. Top-hat performance is particularly critical for displays in automotive applications.

Figure 1:
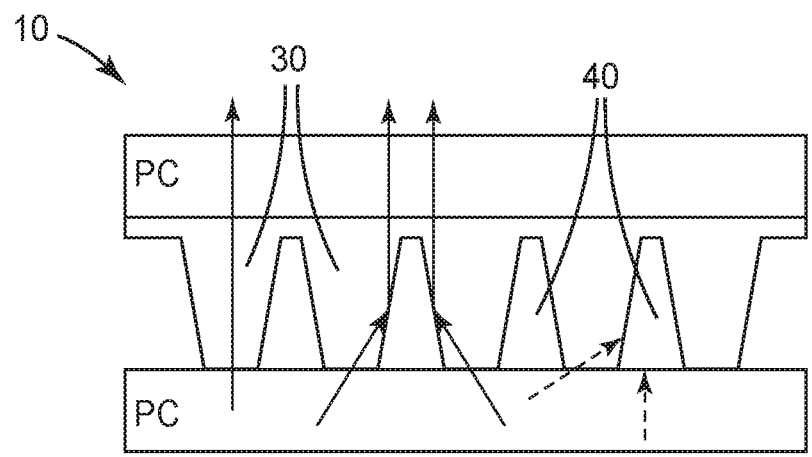
FIG. 1 is a cross-sectional view of a light control film of the prior art.

We have identified factors that are important for top-hat performance in louver-based light control films. For example, in traditional louver films such as film 10 shown in FIG. 1, which includes transmissive regions 30 and dark resin louvers 40, the delta in refractive indices/extinction coefficients between transmissive regions 30 and the dark louvers 40, as well as the angles of the louver walls and are important for enhancing light reflection by total internal reflection (TIR). As illustrated in FIG. 1, both the left and right side angled louver walls collimate light and enhance TIR.

Figure 2:
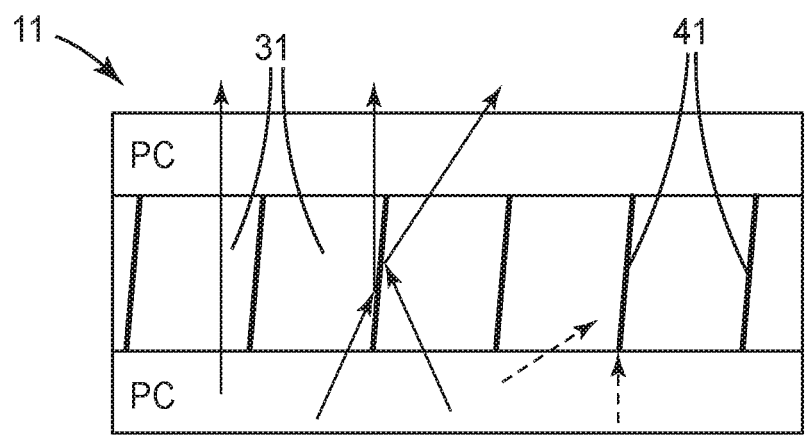
FIG. 2 is a cross-sectional view of a light control film of the prior art.

In contrast, it is difficult to achieve TIR with symmetric high aspect ratio louver films made, e.g., by processes described in WO 2019/118685. FIG. 2 shows film 11 having transmissive regions 31 between high aspect ratio louvers 41. The very thin louvers require very high loadings of light absorbing material (e.g., carbon black) to absorb high angle light. Thus, the refractive index/extinction coefficient is significantly increased, making it difficult to realize TIR at the transmissive region/black louver interface. In addition, while the high aspect ratio louver enables superior axial transmission, it is difficult to use the louver angle to collimate light to achieve top-hat performance. As illustrated in FIG. 2, one side of the louver wall collimates light but the other side de-collimates light.

In one aspect, the present invention provides a light control film comprising:

a light input surface and a light output surface opposite the light input surface;

alternating transmissive regions and absorptive regions disposed between the light input surface and the light output surface; and TIR cladding layers, the TIR cladding layer having a refractive index, $n_{TIR}$, and an extinction coefficient, $k_{TIR}$;

wherein the transmissive regions alternate between high refractive index transmissive regions having a refractive index, $n_2$, and low refractive index transmissive regions having a refractive index, $n_1$, wherein the absorptive regions comprise a core having a refractive index, $n_{core}$, and an extinction coefficient, $k_{core}$, adjacent an AR cladding layer, the AR cladding layer having a refractive index, $n_{AR}$, and an extinction coefficient, $k_{AR}$;

wherein $n_1 < n_2$;

wherein $n_{TIR} < n_2$;

wherein the TIR cladding layers are adjacent the high refractive index transmissive regions;

wherein the cores have an aspect ratio of at least 20; and wherein the high refractive index transmissive regions have a wall angle of 6 degrees or less.

In another aspect, the present invention provides a light control film comprising:

a light input surface and a light output surface opposite the light input surface;

alternating transmissive regions and absorptive regions disposed between the light input surface and the light output surface; and TIR cladding layers, the TIR cladding layer having a refractive index, $n_{TIR}$, and a concentration of light absorbing material, $C_{TIR}$;

wherein the transmissive regions alternate between high refractive index transmissive regions having a refractive index, $n_2$, and low refractive index transmissive regions having a refractive index, $n_1$, wherein the absorptive regions comprise a core having a refractive index, $n_{core}$, and a concentration of light absorbing material, $C_{core}$, adjacent an AR cladding layer, the AR cladding layer having a refractive index, $n_{AR}$, and a concentration of light absorbing material, $C_{AR}$;

wherein $n_1 < n_2$;

wherein $n_{TIR} < n_2$;

wherein the TIR cladding layers are adjacent the high refractive index transmissive regions;

wherein the cores have an aspect ratio of at least 20; and wherein the high refractive index transmissive regions have a wall angle of 6 degrees or less.

The light control films of the present invention provide high transmission as well as improved top-hat performance. One side of the louver has a TIR interface that provides enhanced TIR with collimation. The other side of the louver has an antireflection (AR) interface that has very low reflection and does not significantly increase high angle light due to de-collimation. In some embodiments, e.g., the light control films of the invention have an average relative transmission at a viewing angle of 20 degrees of 45% or more.

The present invention also provides methods for making light control films having high transmission and improved top hat performance.

In one aspect, the present invention provides a method of making a light control film comprising:

providing a microstructured film comprising a plurality of high refractive index transmissive regions having a refractive index, $n_2$, alternated with channels, wherein the microstructured film has a surface defined by a top surface and side walls of the light transmissive regions and a bottom surface of the channels, wherein the side walls have a wall angle of 6 degrees or less;

applying a TIR layer of a light absorptive or transmissive cladding material having a refractive index, $n_{TIR}$, and an extinction coefficient, $k_{TIR}$, to the surface;

applying a layer of a light absorptive core material having a refractive index, $n_{core}$, and an extinction coefficient, $k_{core}$, on the TIR layer;

applying an AR layer of a light absorptive cladding material having a refractive index, $n_{AR}$, and an extinction coefficient, $k_{AR}$, on the layer of light absorptive core material;

removing at least a portion of the TIR layer, the layer of light absorptive core material and the AR layer from the top surface of the light transmissive regions and bottom surface of the channels; and filling the channels with a light transmissive organic polymeric material having a refractive index, $n_1$;

wherein $n_1 < n_2$ and $n_{TIR} < n_2$.

In another aspect, the present invention provides method of making a light control film comprising:

providing a microstructured film comprising a plurality of high refractive index transmissive regions having a refractive index, $n_2$, alternated with channels, wherein the microstructured film has a surface defined by a top surface and side walls of the light transmissive regions and a bottom surface of the channels, wherein the side walls have a wall angle of 6 degrees or less;

applying a TIR layer of a light absorptive or transmissive cladding material having a refractive index, $n_{TIR}$, and a concentration of light absorbing material, $C_{TIR}$, to the surface;

applying a layer of a light absorptive core material having a refractive index, $n_{core}$, and a concentration of light absorbing material, $C_{core}$, on the TIR layer;

applying an AR layer of a light absorptive cladding material having a refractive index, $n_{AR}$, and a concentration of light absorbing material, $C_{AR}$, on the layer of light absorptive core material;

removing at least a portion of the TIR layer, the layer of light absorptive core material and the AR layer from the top surface of the light transmissive regions and bottom surface of the channels; and filling the channels with a light transmissive organic polymeric material having a refractive index, $n_1$;

wherein $n_1 < n_2$ and $n_{TIR} < n_2$.

DETAILED DESCRIPTION

Figure 3A:
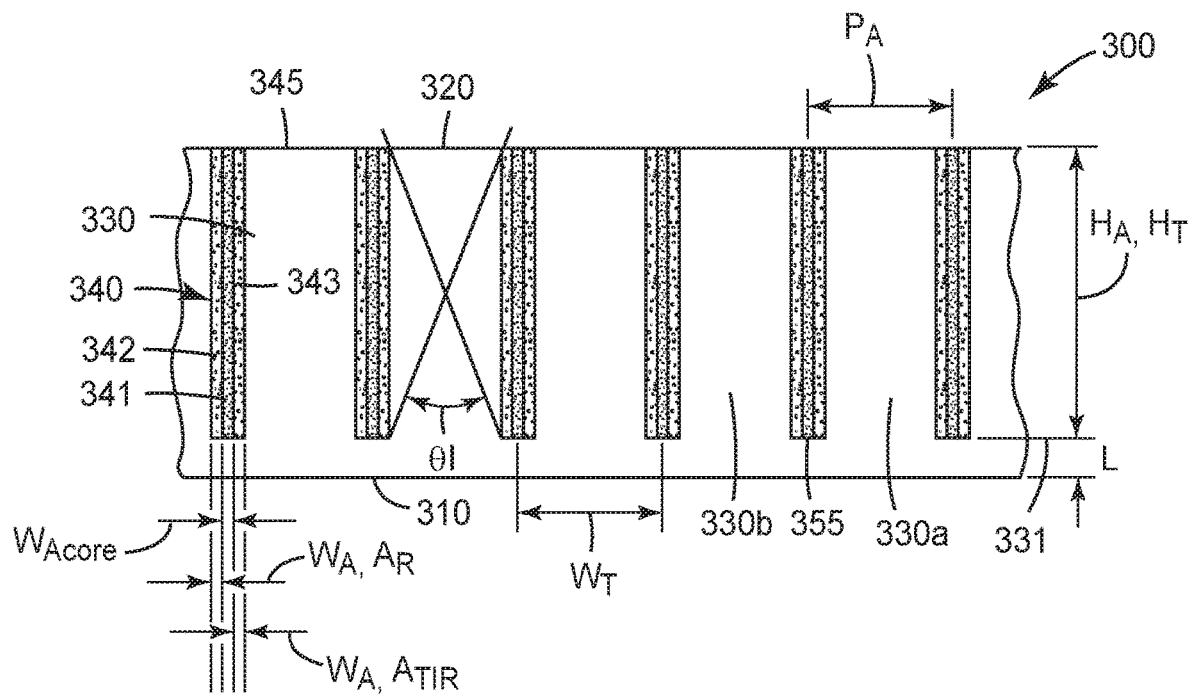
FIG. 3A is a cross-sectional view of an embodied light control film.

In one embodiment, a light control film ("LCF") is described. With reference to FIG. 3A, a cross-sectional view of an embodied LCF 300, the LCF comprises a light output surface 310 and an opposing light input surface 320. The light output surface 310 is typically parallel to the light input surface 320. LCF 300 includes alternating transmissive regions 330 and absorptive regions 340 and TIR cladding layer 343 disposed between the light output surface 310 and a light input surface 320. Transmissive regions 330 alternate between high refractive index transmissive regions 330a and low refractive index transmissive regions 330b. Absorptive regions 340 include core 341 and AR cladding layer 342.

In one embodiment, as depicted in FIG. 3A, the high refractive index transmissive regions 330a are integral with a land region "L", meaning that there is no interface between the land region and the base portion 331 of the transmissive regions 330a. Alternatively, LCF may lack such land region L or an interface may be present between the land region, L, and transmissive regions 330. In this embodiment, the land region is disposed between the alternating transmissive regions 330 and absorptive regions 340 and light input surface 320.

The transmissive regions 330 can be defined by a width "$W_T$". Excluding the land region "L", the transmissive regions 330 typically have nominally the same height as the absorptive regions 340. In typical embodiments, the height of the absorptive regions, HA, is at least 30, 40, 50, 60, 70, 80, 90 or 100 microns. In some embodiments, the height is no greater than 200, 190, 180, 170, 160, or 150 microns. In some embodiments, the height is no greater than 140, 130, 120, 110, or 100 microns. The LCF typically comprises a plurality of transmissive regions having nominally the same height and width. In some embodiments, the transmissive regions have a height, "$H_T$", a maximum width at its widest portion, "$W_T$", and an aspect ratio, $H_T/W_T$, of at least 1.75. In some embodiments, $H_T/W_T$ is at least 2.0, 2.5, 3.0, 3.5, 4.0, 4.5 or 5.0. In other embodiments, the aspect ratio of the transmissive regions is at least 2, 3, 4, 5, 6, 7, 8, 9 or 10. In other embodiments, the aspect ratio of the transmissive regions is at least 15, 20, 25, 30, 35, 40, 45, or 50.

Absorptive regions 340 have a height "$H_A$" defined by the distance between the bottom surface 345 and top surface 355, such top and bottom surfaces typically being parallel to the light output surface 310 and a light input surface 320. The absorptive regions 340 have a maximum width WA and are spaced apart along surface light output surface 120 by a pitch "$P_A$".

The width of the absorptive regions, "$W_A$", at the base (i.e. adjacent to bottom surface 345) is typically nominally the same as the width of the absorptive regions adjacent the top surface 355. However, when the width of the absorptive regions at the base differs from the width adjacent the top surface, the width is defined by the maximum width. The maximum width of a plurality of absorptive regions can be averaged for an area of interest, such as an area in which the transmission (e.g. brightness) is measured. The LCF typically comprises a plurality of absorptive regions having nominally the same height and width. In typical embodiments, the absorptive regions generally have a width no greater than 10, 9, 8, 7, 6, 5, 4, 3, 2, or 1 micron. In some embodiments, the absorptive regions generally have a width no greater than 5, 4, 3, 2, or 1 microns. In some embodiments, the absorptive regions have a width of at least 150, 160, 170, 180, 190, or 200 nanometers.

The absorptive region comprises a core sandwiched between TIR and AR cladding layers. The cores have a width, "$W_{Acore}$", and the cladding layers have a width, "$W_{A-TIRcladding}$" and "$W_{A-ARcladding}$". In typical embodiments, the cores generally have a width no greater than 5, 4, 3, 2, or 1 micron. In some embodiments, the cores generally have a width no greater than 900, 800, 700, 600, 500, 400, 300, or 200 nanometers. In some embodiments, the cores have a width of at least 50, 60, 70, 80, 90, or 100 nanometers. In typical embodiments, each cladding layer generally has a width no greater than 5, 4, 3, 2, or 1 micron. In some embodiments, each cladding layer generally has a width no greater than 900, 800, 700, 600, 500, 400, 300, or 200 nanometers. In some embodiments, each cladding layer has a width of at least 50, 60, 70, 80, 90, or 100 nanometers.

An absorptive region can be defined by an aspect ratio, the height of the absorptive region divided by the maximum width of the absorptive region ($H_A/W_A$). In some embodiments, the aspect ratio of the absorptive regions is at least 1, 2, 3, 4, 5, 6, 7, 8, 9, or 10. In favored embodiments, the height and width of the absorptive region(s) are selected such that the absorptive region(s) have an even higher aspect ratio. In some embodiments, the aspect ratio of the absorptive regions is at least 15, 20, 25, 30, 35, 40, 45, 50, 55, 60, 65, 70, 75, 80, 85, 90, 95 or 100. In other embodiments, the aspect ratio of the absorptive regions is at least 200, 300, 400, or 500. The aspect ratio can range up to 10,000 or greater. In some embodiments, the aspect ratio is no greater than 9,000; 8,000; 7,000; 6,000, 5,000; 4,000; 3000; 2,000; or 1,000.

Figure 3B:
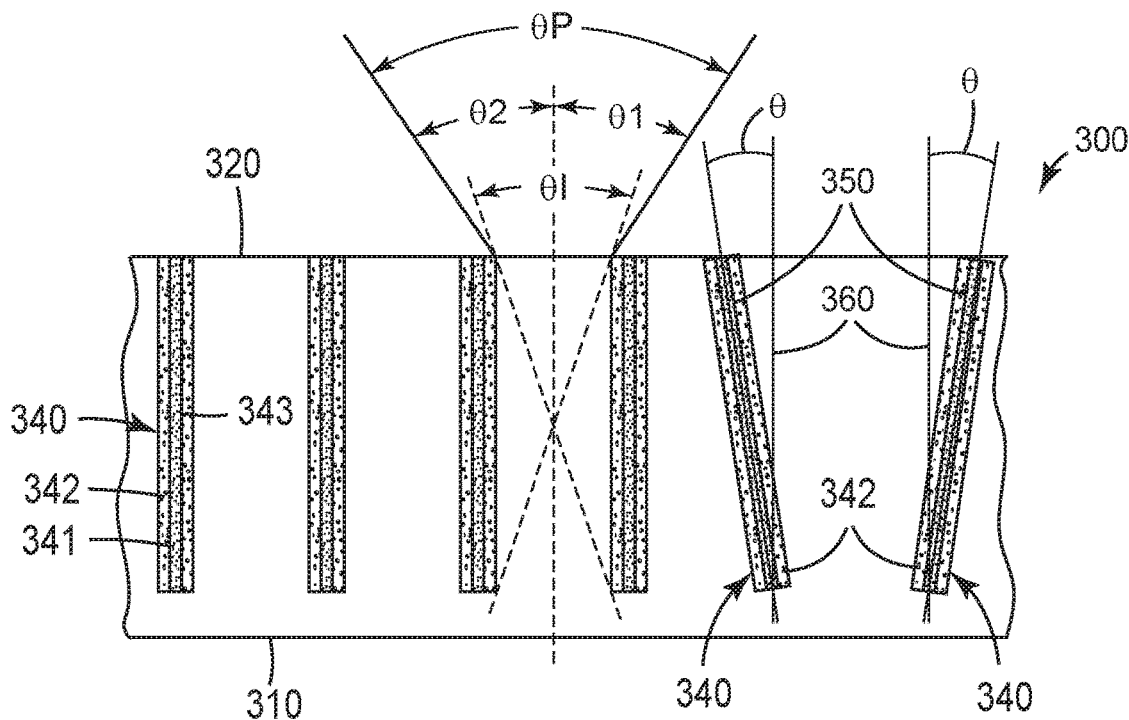
FIG. 3B depicts the polar cut-off viewing angle of the light control film of FIG. 3A.

As shown in FIG. 3B, LCF 300 includes alternating transmissive regions 330a/330b, TIR cladding layers 343 and absorptive regions 340 comprising core 341 and AR cladding layer 342.

There is an interface 150 between transmissive regions 330 and absorptive regions 340. Interface 350 forms a wall angle $\theta$ with line 360 that is perpendicular to light output surface 310.

Larger wall angles $\theta$ decrease transmission at normal incidence or in other words a viewing angle of 0 degrees. Smaller wall angles are preferred such that the transmission of light at normal incidence can be made as large as possible. In some embodiments, the wall angle $\theta$ is less than 10, 9, 8, 7, 6, or 5 degrees. In some embodiments, the wall angle is no greater than 2.5, 2.0. 1.5, 1.0, 0.5, or 0.1 degrees. In some embodiments, the wall angle is approaching zero. When the wall angle is zero, the angle between the absorptive regions and light output surface 120 is 90 degrees. Depending on the wall angle, the transmissive regions can have a trapezoidal or nearly rectangular cross-section.

The transmission (e.g. brightness of visible light) can be increased when incident light undergoes total internal reflection (TIR) from the interface between the absorptive and transmissive regions. Whether a light ray will undergo TIR or not, can be determined from the incidence angle with the interface, and the difference in refractive index of the materials of the transmissive and absorptive regions.

As shown in FIG. 3B, transmissive regions 330 between absorptive regions 340a/330b have an interface angle $\theta_I$ defined by the geometry of alternating transmissive regions 330 and absorptive regions. As depicted in FIGS. 3A and 3B, the interface angle $\theta_I$ can be defined by the intersection of two lines. The first line extends from a first point, defined by the bottom surface and the side wall surface of a first absorptive region, and a second point defined by the top surface and side wall surface of the nearest second absorptive region. The second line extends from a first point defined, by the top surface and the side wall surface of the first absorptive region, and a second point, defined by the bottom surface and side wall surface of the second absorptive region.

The polar cut-off viewing angle $\theta P$ is equal to the sum of a polar cut-off viewing half angle $\theta 1$ and a polar cut-off viewing half angle $\theta 2$ each of which are measured from the normal to light input surface 320. In typical embodiments, the polar cut-off viewing angle $\theta P$ is symmetric, and polar cut-off viewing half angle $\theta 1$ is equal to polar viewing half angle $\theta 2$. Alternatively, the polar cut-off viewing angle $\theta P$ can be asymmetric, and polar cut-off viewing half angle $\theta 1$ is not equal to polar cut-off viewing half angle $\theta 2$.

Figure 4:
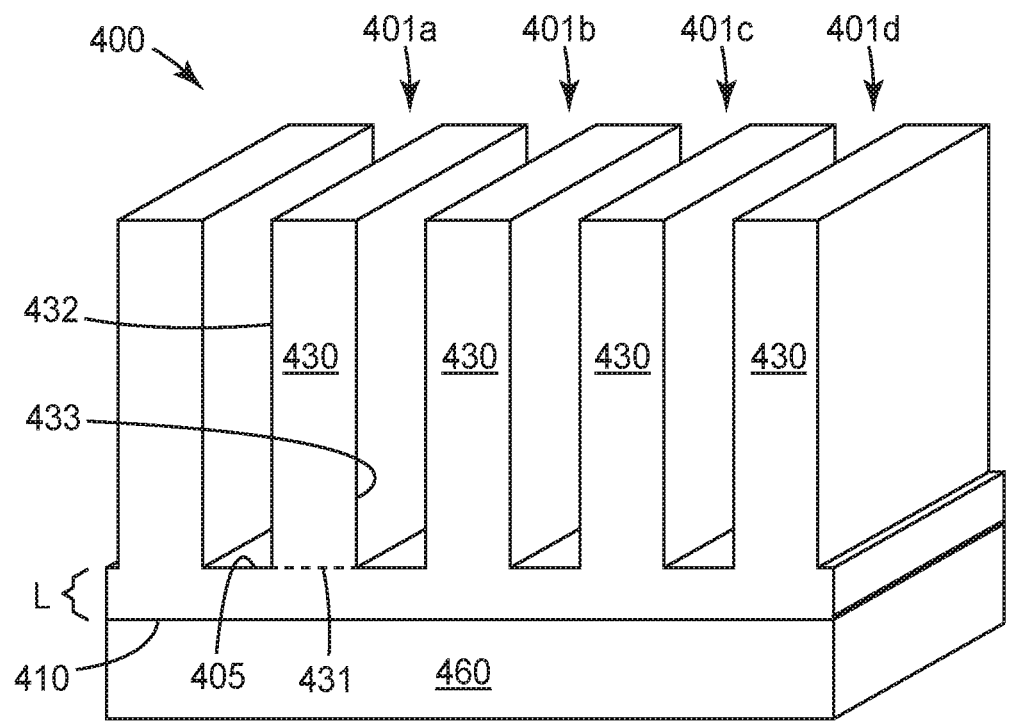
FIG. 4 is a perspective schematic of a microstructured film article.
Figure 5A:
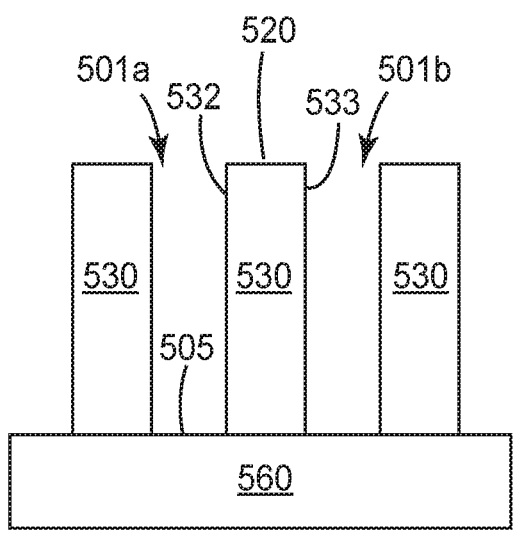
FIGS. 5A-5F are a cross-sectional schematic of an embodied method of making a light control film.
Figure 5B:
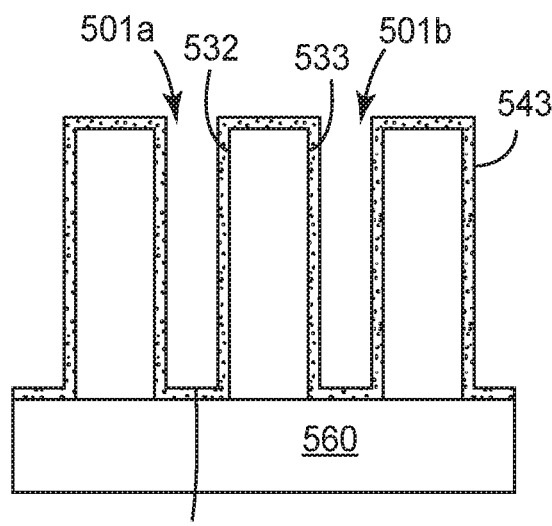
Figure 5C:
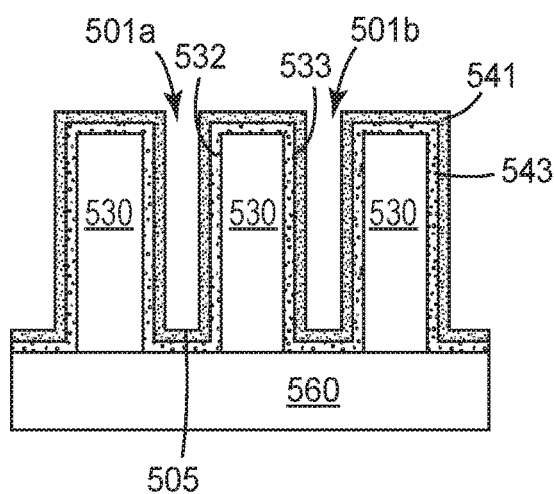
Figure 5D:
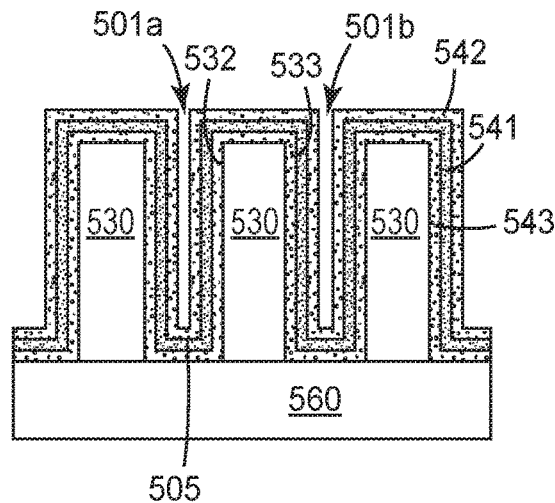
Figure 5E:
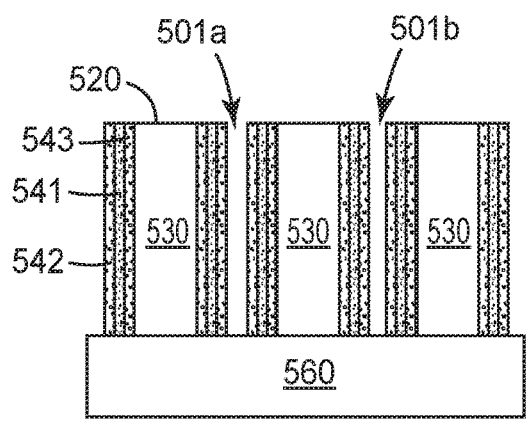
Figure 5F:
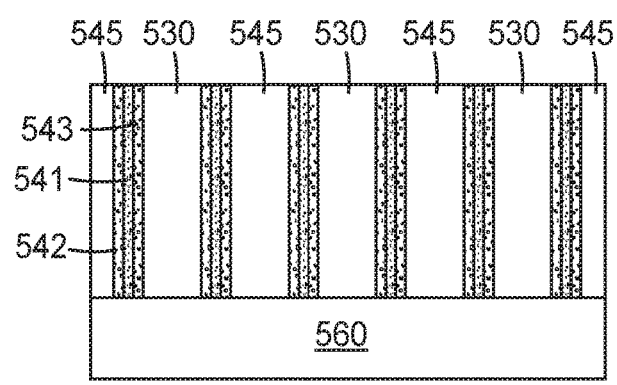

Luminance can be measured, e.g., using conoscopic measurements as described in Luminance Profile from a Collimated Light Source test method. The luminance can be measured on the alternating transmissive and absorptive regions, such as illustrated in FIG. 3A or the total light control film that may further comprise a cover film, such as illustrated in FIG. 4. Relative transmission (e.g. brightness of visible light) is defined as the percentage of luminance, at a specified viewing angle or range of viewing angles, between a reading with the light control film including the alternating transmissive and absorptive regions and optionally other layers and a reading without the light control film (i.e., the baseline). The viewing angle can range from −90 degrees to +90 degrees. A viewing angle of 0 degrees is orthogonal to light input surface 320; whereas viewing angles of −90 degrees and +90 degrees are parallel to light input surface 320

The alternating transmissive and absorptive regions or total LCF can exhibit increased relative transmission (e.g. brightness) at a viewing angle of 0 degrees. In some embodiments, the relative transmission (e.g. brightness) is at least 75, 80, 85, or 90%. The relative transmission (e.g. brightness) is typically less than 100%. In typical embodiments, the LCF has significantly lower transmission at other viewing angles. For example, in some embodiments, the relative transmission (e.g. brightness) at a viewing angle of −30 degrees, +30 degrees, or an average of −30 degrees and +30 degrees is less than 50, 45, 40, 35, 30, or 25%. In other embodiments, the relative transmission (e.g. brightness) at a viewing angle of 30 degrees, +30 degrees, or the average of −30 degrees and +30 degrees is less than 25, 20, 15, 10 or 5%. In some embodiments, the relative transmission (e.g. brightness) at a viewing angle of +/−35, +/−40, +/−45, +1-50, +/−55, +/−60, +/−65, +/−70, +/−75, or +/−80 degrees is less than 25, 20, 15, 10 or 5%, or less than 5%. In some embodiments, the average relative transmission (e.g. brightness) for viewing angles ranging from +35 to +80 degrees, −35 to −80 degrees, or the average of these ranges is less than 10, 9, 8, 7, 6, 5, 4, 3, or 2%.

For many applications it is advantageous to increase brightness and thus transmission of a louver film for non-zero angles up to 25 degrees for better display uniformity and larger view box. Embodiments of the invention can increase transmission at 10 degrees by 25% over the prior art (e.g., from the base case of 70% transmission to 87%), at 15 degrees by 33% (55% vs 73%), at 20 degrees by 49% (37% Vs 55%) and at 25 degrees by 76% (17% vs 30%). The TIR cladding layer can increase the transmission at low angles (e.g., 25 degrees and under) while maintaining low transmission at higher angles (e.g., 35 degrees and above). This is improvement is from total internal reflection where the high index $n_2$ of the bulk material and low index $n_{TIR}$ of the TIR cladding layer will have total reflection from the louver sidewall up to the critical angle $\alpha_c$ where $\alpha_c = \sin^{-1}(n_{TIR}/n_2)$ and $\alpha_c$ is the angle from the normal direction from the louver. There will be very low reflection at angles that are beyond the critical angle, leading to low transmission or brightness through the louver at angles above 35 degrees.

LCFs with significantly lower transmission at "off-axis" viewing angles (e.g., beyond about 30 degrees) are suitable for use as privacy films. Such films allow a viewer directly in front of a display (viewing angle of 0 degrees) to see the image, yet blocks viewers at "off-axis" angles from seeing such image. The LCFs of the invention show also show improved top-hat performance and are therefore particularly useful in automotive applications.

The absorptive regions can be formed by coating the surface of a microstructured film.

FIG. 4 shows an embodied microstructured film article 400 that can be coated to make a LCF. The depicted microstructured film includes a microstructured top surface comprising a plurality of channels 401a-401d on base layer 460. As shown in FIG. 4, a continuous land layer "L" can be present between the bottom of the channels 405 and the top surface 410 of base layer 460. Alternatively, the channels 401 can extend all the way through the microstructured film article 400 to base layer 460. In this embodiment (not shown), the bottom surface 405 of the groove can be coincident with the top surface 410 of a base layer 460. In typical embodiments, the base layer 460 is a preformed film that comprises a different organic polymeric material than the transmissive regions 430 as will subsequently be described.

The height and width of protrusions (e.g. transmissive regions) 430 are defined by adjacent channels (e.g. 401a and 401b). The protrusions (e.g. transmissive regions) 430 can be defined by a top surface 420, a bottom surface, 431, and side walls 432 and 433 that join the top surface to the bottom surface. The side walls can be parallel to each other. More typically the side walls have a wall angle as previously described.

In some embodiments, the protrusions (e.g. transmissive regions) 430 have a pitch, "$P_T$" of at least 10 microns. The pitch is the distance between the onset of a first protrusion (e.g. transmissive region) and the onset of a second protrusion (e.g. transmissive region) as depicted in FIG. 4. The pitch may be at least 15, 20, 25, 30, 35, 40, 45, or 50 microns. The pitch is generally no greater than 1 mm. The pitch is typically no greater than 900, 800, 700, 600, or 500 microns. In some embodiments, the pitch is typically no greater than 550, 500, 450, 400, 350, 300, 250 or 200 microns. In some embodiments, the pitch is no greater than 175, 150, 100 microns. In typical embodiments, the protrusions are evenly spaced, having a single pitch. Alternatively, the protrusions may be spaced such that the pitch between adjacent protrusions is not the same. In this later embodiment, at least some and typically the majority (at least 50, 60, 70, 80, 90% or greater of the total protrusions) have the pitch just described.

The pitch of the absorptive regions $P_A$ is within the same range as just described for the light transmissive regions.

The pitch and height of the protrusions (e.g. transmissive regions) can be important to facilitate coating of the protrusions (e.g. transmissive regions) with light absorbing coatings. When the protrusions are spaced too close together it can be difficult to uniformly coat the side walls. When the protrusions are spaced too far apart, the light absorbing coating may not be effective at providing its intended function, such as privacy at off-axis viewing angles.

The TIR cladding layer and absorptive regions are formed by providing two or more light absorptive coatings on the side walls of protrusions (e.g. transmissive regions) of a microstructured film. The layers can be formed by any method that provides a sufficiently thin, conformal, light transmissive or absorptive coating on the side walls (e.g. 432, 433). As used herein, the term "conformal" or "conformal coating" means a coating having a thickness varying by less than 20% throughout the middle 80% of $H_A$. In one embodiment, the absorptive regions are formed by a combination of additive and subtractive methods.

With reference to FIGS. 5A-5F, the light control film can be prepared by providing a microstructured film 500 (such as the microstructured film of FIG. 4) comprising a plurality of protrusions (e.g. transmissive regions) defined by atop surface (e.g. 520) and side walls (532, 533). The plurality of protrusions (e.g. transmissive regions) 530 are separated from each other by channels 501a and 501b. The side walls of the protrusions (e.g. transmissive regions) are coincident with the side walls of the channels. The channels further comprise a bottom surface 505 that is parallel to or coincident with top surface of base layer 560. The method further comprises applying a light transmissive or absorptive TIR cladding coating 543 to the (e.g. entire) surface of the microstructured film, i.e. the top surface 520 and side walls 532, 533 of the protrusions (e.g. transmissive regions) and the bottom surface 505 of the channels that separate the protrusions (e.g. transmissive regions). The method further comprises applying a light absorptive core coating 541 to the (e.g. entire) surface of the cladding coating. The method further comprises applying an AR light absorptive cladding coating 542 to the (e.g. entire) surface of the light absorptive core coating. The method further comprises substantially removing the coatings from the top surface 520 of the protrusions (e.g. transmissive regions) and bottom surface 505 of the channels. As used herein, the term "substantially removing the coatings" acknowledges that some residue may remain. The method further comprises filling the channels with a low index organic polymeric material 545 and curing the polymerizable resin.

A microstructure-bearing article (e.g. microstructured film article 400 shown in FIG. 4) can be prepared by any suitable method. In one embodiment, the microstructure-bearing article (e.g. microstructured film article 400 shown in FIG. 4) can be prepared by a method including the steps of (a) preparing a polymerizable composition; (b) depositing the polymerizable composition onto a master negative microstructured molding surface (e.g. tool) in an amount barely sufficient to fill the cavities of the master; (c) filling the cavities by moving a bead of the polymerizable composition between a (e.g. preformed film) base layer and the master, at least one of which is flexible; and (d) curing the composition. The deposition temperature can range from ambient temperature to about 180° F. (82° C.). The master can be metallic, such as nickel, chrome- or nickel-plated copper or brass, or can be a thermoplastic material that is stable under the polymerization conditions, and has a surface energy that allows clean removal of the polymerized material from the master. When the base layer is a preformed film, one or more of the surfaces of the film can optionally be primed or otherwise be treated to promote adhesion with the organic material of the light transmissive regions.

The polymerizable resin has a refractive index of 1.3 to 1.55 or 1.47 to 1.55. The resin can be made, e.g., from materials such as those described in U.S. Pat. No. 9,360,59. In some embodiments, the microstructured article comprises the reaction product of a polymerizable composition comprising at least 20 wt. % of inorganic nanoparticles and a non-aromatic multi-(meth)acrylate monomer comprising at least three contiguous alkylene oxide repeat units. In some embodiments, the alkylene oxide repeat units have the formula —[O-L]- wherein each L is independently a $C_2$-$C_6$ alkylene.

The chemical composition and thickness of the base layer can depend on the end use of the LCF. In typical embodiments, the thickness of the base layer can be at least about 0.025 millimeters (mm) and can be from about 0.05 mm to about 0.25 mm.

Useful base layer materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polyolefin-based material such as cast or orientated films of polyethylene, polypropylene, and polycyclo-olefins, polyimides, and glass. Optionally, the base layer can contain mixtures or combinations of these materials. In some embodiments, the base layer may be multi-layered or may contain a dispersed component suspended or dispersed in a continuous phase.

Examples of base layer materials include polyethylene terephthalate (PET) and polycarbonate (PC). Examples of useful PET films include photograde polyethylene terephthalate, available from DuPont Films of Wilmington, Del. under the trade designation "Melinex 618". Examples of optical grade polycarbonate films include LEXAN™ polycarbonate film 8010, available from GE Polymershapes, Seattle Wash., and Panlite 1151, available from Teijin Kasei, Alpharetta Ga.

Some base layers can be optically active, and can act as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microtine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. No. 5,825,543 (Ouderkirk et al.); U.S. Pat. No. 5,783,120 (Ouderkirk et al.); U.S. Pat. No. 5,882,774 (Jonza et al.); U.S. Pat. No. 5,612,820 (Shrenk et al.) and U.S. Pat. No. 5,486,949 (Shrenk et al.). The use of these polarizer films in combination with prismatic brightness enhancement film has been described, for example, in U.S. Pat. No. 6,111,696 (Allen et al.) and U.S. Pat. No. 5,828,488 (Ouderkirk et al.). Films available commercially are multilayer reflective polarizer films such as 3M™ Dual Brightness Enhancement Film "DBEF", available from 3M Company.

In some embodiments, the base layer is a multilayer film that imparts a color shifting effect such as described in U.S. Pat. No. 8,503,122. Suitable color shifting films are described in U.S. Pat. No. 6,531,230 to Weber et al.; incorporated herein by reference.

Other suitable color shifting films include multilayer films generated by spin coating, blade coating, dip coating, evaporation, sputtering, chemical vapor deposition (CVD), and the like. Exemplary films include both organic and inorganic materials. Such films are described, for instance, in U.S. Pat. Nos. 7,140,741; 7,486,019; and 7,018,713.

Alternatively, the microstructure-bearing article (e.g. microstructured film article 400 shown in FIG. 4) can be prepared by melt extrusion, i.e. casting a fluid resin composition onto a master negative microstructured molding surface (e.g. tool) and allowing the composition to harden. In this embodiment, the protrusions (e.g. light transmissive regions) are interconnected in a continuous layer to base layer 260. The individual protrusions (e.g. light transmissive regions) and connections therebetween generally comprises the same thermoplastic material. The thickness of the land layer (i.e. the thickness excluding that portion resulting from the replicated microstructure) is typically between 0.001 and 0.100 inches and preferably between 0.003 and 0.010 inches.

Suitable resin compositions for melt extrusion are transparent materials that are dimensionally stable, durable, weatherable, and readily formable into the desired configuration. Examples of suitable materials include acrylics, which have an index of refraction of about 1.5, such as Plexiglas brand resin manufactured by Rohm and Haas Company; polycarbonates, which have an index of refraction of about 1.59; reactive materials such as thermoset acrylates and epoxy acrylates; polyethylene based ionomers, such as those marketed under the brand name of SURLYN by E. I. Dupont de Nemours and Co., Inc.; (poly)ethylene-co-acrylic acid; polyesters; polyurethanes; and cellulose acetate butyrates. Polycarbonates are particularly suitable because of their toughness and relatively higher refractive index.

In yet another embodiment, the master negative microstructured molding surface (e.g. tool) can be employed as an embossing tool, such as described in U.S. Pat. No. 4,601,861 (Pricone).

The TIR cladding and absorptive regions are generally formed by coating the surface of a microstructured film. Various coating methods can be used including for example layer-by-layer (LbL) coating, vapor deposition, sputtering, reactive sputtering and atomic layer deposition (ALD).

Light absorbing materials useful for forming the core and cladding layer(s) of the light absorbing regions can be any suitable material that functions to absorb or block light at least in a portion of the visible spectrum. Preferably, the light absorbing material can be coated or otherwise provided on the side walls of the light transmissive regions to form light absorbing regions in the LCF. Exemplary light absorbing materials include a black or other light absorbing colorant (such as carbon black or another pigment or dye, or combinations thereof). Other light absorbing materials can include particles or other scattering elements that can function to block light from being transmitted through the light absorbing regions. The light absorbing materials in the core and cladding layers may be the same or different.

When a light absorbing material (e.g. coating) includes particles, the particles have a median particle size D50 equal to or less than the thickness of the light absorbing material (e.g. coating) or in other words substantially less than the width of the absorptive regions $W_A$.

The median particle size is generally less than 1 micron. In some embodiments, the median particle size is no greater than 900, 800, 700, 600, or 500 nm. In some embodiments, the median particle size is no greater than 450, 400, 350, 300, 250, 200, or 100 nm. In some embodiments, the median particle size is no greater than 90, 85, 80, 75, 70, 65, 60, 55, or 50 nm. In some embodiments, the median particle size is no greater than 30, 25, 20, or 15 nm. The median particle size is typically at least 1, 2, 3, 4, or 5 nanometers. The particle size of the nanoparticles of the absorptive regions can be measured using transmission electron microscopy or scanning electron microscopy, for example.

"Primary particle size" refers to the median diameter of a single (non-aggregate, non-agglomerate) particle. "Agglomerate" refers to a weak association between primary particles which may be held together by charge or polarity and can be broken down into smaller entities. As used herein "aggregate" with respect to particles refers to strongly bonded or fused particles where the resulting external surface area may be significantly smaller than the sum of calculated surface areas of the individual components. The forces holding an aggregate together are strong forces, for example covalent bonds, or those resulting from sintering or complex physical entanglement. Although agglomerated nanoparticles can be broken down into smaller entities such as discrete primary particles such as by application of a surface treatment; the application of a surface treatment to an aggregate simply results in a surface treated aggregate. In some embodiments, a majority of the nanoparticles (i.e. at least 50%) are present as discrete unagglomerated nanoparticles. For example, at least 70%, 80% or 90% of the nanoparticles (e.g. of the coating solution) are present as discrete unagglomerated nanoparticles.

The concentration of light absorbing nanoparticles in the core is typically at least 10, 15, 20, 25, 30, 35, 40, 45, or 50 wt. % of the total light absorptive core region. In some embodiments, the concentration of light absorbing nanoparticles in the core is at least 55, 60, 65, 70, 75, 80, 85, 90 or 95 wt. % of the total light absorptive core regions. In some embodiments, the concentration of light absorbing nanoparticles in the core is 100 wt. %. In some embodiments, the concentration of light absorbing nanoparticles in the cores is 30-100 wt. % or 75-90 wt. % of the total light absorptive core regions.

The concentration of light absorbing nanoparticles in the TIR and AR cladding layers is less than the concentration of light absorbing nanoparticles in the core. In some embodiments, the concentration of light absorbing nanoparticles in the TIR cladding layer is less than in the AR cladding layer.

The concentration of light absorbing nanoparticles in the AR cladding layer is typically at least 0.5, 1, 5, 10, 15, 20, 25, 30, 35, 40 or 45 wt. % of the total cladding layer. In some embodiments the concentration of light absorbing nanoparticles in the AR cladding layer is no more than 20, 25, 30, 35, 40, 45, 50, 55, 60, 70, or 75 wt. % of the total cladding layer. In some embodiments, the concentration of light absorbing nanoparticles in the AR cladding layer is 0.5-50 wt. % or 25-45 wt. % of the total AR cladding layer. In some embodiments, the concentration of light absorbing nanoparticles is at least 30% less than the concentration of light absorbing nanoparticles in the core.

The concentration of light absorbing nanoparticles in the TIR cladding layer is typically at least 0.5, 1, 5, 10, 15, 20, 25, 30 or 35 wt. % of the total cladding layer. In some embodiments the concentration of light absorbing nanoparticles in the TIR cladding layer is no more than 20, 25, 30, 35 or 40 wt. % of the total cladding layer. In some embodiments, the concentration of light absorbing nanoparticles in the AR cladding layer is 0-40 wt. % or 25-35 wt. % of the total TIR cladding layer. In some embodiments, the concentration of light absorbing nanoparticles is at least 30% less than the concentration of light absorbing nanoparticles in the core. In some embodiments, however, the TIR cladding layer is light transmissive.

In some embodiments, the AR and TIR cladding layers further comprise non-light absorbing diluent. As used herein, the term "non-light absorbing" means that the diluent does not substantially absorb visible light (e.g., 400-700 nm wavelengths) or is transparent (i.e., having an extinction coefficient across the visible light spectrum close to zero, for example, less than 0.01 or less than 0.001). In some embodiments, the non-light absorbing diluent comprises an inorganic material, such as nano-silica particles. In some embodiments, the non-light absorbing diluent is an organic material. Suitable organic materials include acrylic emulsions, polyurethane dispersions, sulfopolyesters, and other types of aqueous latexes. The particles must possess sufficient surface charge (either anionic or cationic) to deposit via electrostatic-based layer-by-layer assembly. The preferable particle diameter (i.e., median particle diameter, d50) is less than 500 nm, more preferably less than 250 nm. An example anionic acrylic emulsion is NeoCryl® A-639 available from DSM Coating Resins (Wilmington, Mass.). An example anionic polyurethane dispersion is Impranil® DLC-F available from Covestro (Pittsburgh, Pa.). An example sulfopolyester is Eastek 1100 available from Eastman Chemical (Kingsport, Tenn.). The diluents can be mixed with carbon black and co-deposited; alternatively, the diluents can be prepared as separate coating solutions and deposited in separate layers from the carbon black.

The concentration of light absorbing nanoparticles can be determined by methods known in the art, such as thermogravimetric analysis.

The extinction coefficient of the cores is typically 0.1 to 0.5. In some embodiments the extinction coefficient of the cores is 0.2 to 0.4.

The extinction coefficient of the TIR cladding layer and the extinction coefficient of the AR cladding layer is less than the extinction coefficient of the cores. In some embodiments, the extinction coefficient of the TIR cladding layer is less than the extinction coefficient of the AR cladding layer.

The extinction coefficient of the AR cladding layer is 0.005 to 0.15. In some embodiments, the extinction coefficient of the AR cladding layer(s) is 0.01 to 0.1. In some embodiments, the extinction coefficient of the AR cladding layer(s) is at least 50% less than the extinction coefficient of the cores.

The extinction coefficient of the TIR cladding layer is 0 to 0.1. In some embodiments, the extinction coefficient of the TIR cladding layer(s) is 0 to 0.01. In some embodiments, the extinction coefficient of the cladding layer(s) is at least 50% less than the extinction coefficient of the cores.

The extinction coefficient, k, of a thin film coating can be determined, for example, via either ellipsometry or UV/Vis spectroscopy. k is defined as $\alpha\lambda/(4\pi)$ where $\alpha$ is the absorption coefficient and is wavelength. For a thin film coating on a transparent substrate, one can use UV/Vis spectroscopy to measure the absorptance (A) as 1−T−R, where T is transmittance and R is reflectance. The measured A must be appropriately corrected for the A of the substrate to obtain A of the thin film itself. A is then converted to a by the equation $\alpha = -\ln[(100-A)/100]/h$ where h is the thickness of the thin film coating; this equation for a is an approximation used when R is relatively small, and A is relatively large. Thickness can be measured, for example, by stylus profilometry or cross-sectional scanning electron microscopy.

The core typically has an index of refraction of 1.7 to 2.0. The TIR cladding layer typically has an index of refraction of 1.40 to 1.65. The AR cladding layer typically has an index of refraction of 1.40 to 1.65.

In one embodiment, the method comprises applying a layer-by layer light absorptive coating (i.e. core and cladding layer coatings) to the surface of the microstructured film, i.e. the top surface and side walls of the protrusions and bottom surface of the channels.

In some embodiments, the plurality of layers disposed on the surface of the microstructured film comprise at least two bi-layers deposited by what is commonly referred to as a "layer-by-layer self-assembly process". This process is commonly used to assemble films or coatings of oppositely charged polyelectrolytes electrostatically, but other functionalities such as hydrogen bond donor/acceptors, metal ions/ligands, and covalent bonding moieties can be the driving force for film assembly. "Polyelectrolyte" means a polymer or compound with multiple ionic groups capable of electrostatic interaction. "Strong polyelectrolytes" possess permanent charges across a wide range of pH (e.g., polymers containing quaternary ammonium groups or sulfonic acid groups). "Weak polyelectrolytes" possess a pH-dependent level of charge (e.g. polymers containing primary, secondary, or tertiary amines, or carboxylic acids). Typically, this deposition process involves exposing the substrate having a surface charge, to a series of liquid solutions, or baths. This can be accomplished by immersion of the substrate into liquid baths (also referred to as dip coating), spraying, spin coating, roll coating, inkjet printing, and the like. Exposure to the first polyion (e.g. polyelectrolyte bath) liquid solution, which has charge opposite that of the substrate, results in charged species near the substrate surface adsorbing quickly, establishing a concentration gradient, and drawing more polyelectrolyte from the bulk solution to the surface. Further adsorption occurs until a sufficient layer has developed to mask the underlying charge and reverse the net charge of the substrate surface. In order for mass transfer and adsorption to occur, this exposure time is typically on the order of minutes. The substrate is then removed from the first polyion (e.g. bath) liquid solution, and is then exposed to a series of water rinse baths to remove any physically entangled or loosely bound polyelectrolyte. Following these rinse (e.g. bath) liquid solutions, the substrate is then exposed to a second polyion (e.g. polyelectrolyte or inorganic oxide nanoparticle bath) liquid solution, which has charge opposite that of the first polyion (e.g. bath) liquid solution. Once again adsorption occurs, since the surface charge of the substrate is opposite that of the second (e.g. bath) liquid solution. Continued exposure to the second polyion (e.g. bath) liquid solution then results in a reversal of the surface charge of the substrate. A subsequent rinsing can be performed to complete the cycle. This sequence of steps is said to build up one layer pair, also referred to herein as a "bi-layer" of deposition and can be repeated as desired to add further layer pairs to the substrate.

Some examples of suitable processes include those described in Krogman et al., U.S. Pat. No. 8,234,998; Hammond-Cunningham et al., US2011/0064936; and Nogueira et al., U.S. Pat. No. 8,313,798. Layer-by layer dip coating can be conducted using a StratoSequence VI (nanoStrata Inc., Tallahassee, Fla.) dip coating robot.

In one embodiment, the plurality of bi-layers deposited by layer-by-layer self-assembly is a polyelectrolyte stack comprising an organic polymeric polyion (e.g. cation) and counterion (e.g. anion) comprising a light absorbing material (e.g. pigment). At least a portion of the cation layers, anion layers, or a combination thereof comprise a light absorbing material (e.g. pigment) ionically bonded to the polyelectrolyte. It should be appreciated that individual bi-layers in the final article may not be distinguishable from each other by common methods in the art such as scanning electron microscopy (SEM) or transmission electron microscopy (TEM).

The thickness of a bi-layer and the number of bi-layers are selected to achieve the desired light absorption. In some embodiments, the thickness of a bi-layer, the number of bi-layers are selected to achieve the desired (e.g. absorption) optical properties using the minimum total thickness of self-assembled layers and/or the minimum number of layer-by-layer deposition steps. The thickness of each bi-layer typically ranges from about 5 nm to 350 nm. The number of bi-layers is typically at least 5, 6, 7, 8, 9, or 10. In some embodiments, the number of bilayers per stack is no greater than 150 or 100. The thickness of a stack is equivalent to the width of the absorptive regions $W_A$, as previously described.

A light absorbing compound is dispersed within at least a portion of the polyelectrolyte layers. Various polyelectrolytes can be utilized including inorganic compounds, such as silica or silicate, as well as various phosphonocarboxylic acids and salts thereof (some of which are described in WO2015/095317; incorporated herein by reference.)

Polyelectrolyte organic polymers can be preferred since such materials can be more easily removed by reactive ion etching than inorganic materials.

Suitable polycationic organic polymers include, but are not limited to linear and branched poly(ethylenimine) (PEI), poly(allylamine hydrochloride), polyvinylamine, chitosan, polyaniline, polyamidoamine, poly(vinylbenzyltriamethylamine), polydiallyldimethylammonium chloride (PDAC), poly(dimethylaminoethyl methacrylate), poly(methacryloylamino)propyl-trimethylammonium chloride, and combinations thereof including copolymers thereof.

Suitable polyanionic organic polymers include, but are not limited to, poly(vinyl sulfate), poly(vinyl sulfonate), poly(acrylic acid) (PAA), poly(methacrylic acid), poly(styrene sulfonate), dextran sulfate, heparin, hyaluronic acid, carrageenan, carboxymethylcellulose, alginate, sulfonated tetrafluoroethylene based fluoropolymers such as Nafion®, poly(vinylphosphoric acid), poly(vinylphosphonic acid), and combinations thereof including copolymers thereof.

The molecular weight of the polyelectrolyte polymers can vary, ranging from about 1,000 g/mole to about 1,000,000 g/mole. In some embodiments, the molecular weight (Mw) of the (e.g. poly(acrylic acid)) negatively charged anionic layer ranges from 50,000 g/mole to 150,000 g/mole. In some embodiments, the molecular weight (Mw) of the (e.g. polydiallyldimethylammonium chloride) positively charged cationic layer ranges from 50,000 g/mole to 300,000 g/mole. In some embodiments, the molecular weight (Mw) of the (e.g. poly(ethylenimine)) positively charged cationic layer ranges from 10,000 g/mole to 50,000 g/mole. At least one of the polyions (e.g. the polyanion or polycation) comprises a light absorbing material.

In order to be stable in water as a colloidal dispersion and impart polyionic groups, the light absorbing (e.g. pigment) particles typically further comprise an ionic surface treatment. In some embodiments, the surface treatment compound is anionic, such as in the case of sulfonate or carboxylate. The light absorbing (e.g. pigment) particles also function as the ionic binding group for the alternating polyelectrolyte layer.

Suitable pigments are available commercially as colloidally stable water dispersions from manufacturers such as Cabot, Clariant, DuPont, Dainippon and DeGussa. Particularly suitable pigments include those available from Cabot Corporation under the CAB-O-JET® name, for example 250C (cyan), 260M (magenta), 270Y (yellow) or 352K (black). The light absorbing (e.g. pigment) particles are typically surface treated to impart ionizable functionality. Examples of suitable ionizable functionality for light absorbing (e.g. pigment) particles include sulfonate functionality, carboxylate functionality as well as phosphate or bisphosphonate functionality. In some embodiments, surface treated light absorbing (e.g. pigment) particles having ionizable functionality are commercially available. For example, CAB-O-JET® pigments, commercially available from Cabot Corporation, sold under the trade names 250C (cyan), 260M (magenta), 270Y (yellow) and 200 (black), comprise sulfonate functionality. Yet another example, CAB-O-JET® pigments commercially available from Cabot Corporation, under the trade names 352K (black) and 300 (black), comprise carboxylate functionality.

When the light absorbing (e.g. pigment) particles are not pre-treated, the light absorbing (e.g. pigment) particles can be surface treated to impart ionizable functionality as known in the art.

Multiple light absorbing materials (e.g. pigments) may be utilized to achieve a specific hue or shade or color in the final product. When multiple light absorbing materials (e.g. pigments) are used, the materials are selected to ensure their compatibility and performance both with each other and with the optical product components.

In favored embodiments, the polyelectrolyte is prepared and applied to the microstructured surface as an aqueous solution. The term "aqueous" means that the liquid of the coating contains at least 85 percent by weight of water. It may contain a higher amount of water such as, for example, at least 90, 95, or even at least 99 percent by weight of water or more. The aqueous liquid medium may comprise a mixture of water and one or more water-soluble organic cosolvent(s), in amounts such that the aqueous liquid medium forms a single phase. Examples of water-soluble organic cosolvents include methanol, ethanol, isopropanol, 2-methoxyethanol, 3-methoxypropanol, 1-methoxy-2-propanol, tetrahydrofuran, and ketone or ester solvents. The amount of organic cosolvent typically does not exceed 15 wt-% of the total liquids of the coating composition. The aqueous polyelectrolyte composition for use in layer-by-layer self-assembly typically comprises at least 0.01 wt-%, 0.05 wt-% or 0.1 wt-% of polyelectrolyte and typically no greater than 5 wt-%, 4 wt-%, 3 wt-%, 2 wt-% or 1 wt-%.

In some embodiments, the aqueous solutions further comprise a "screening agent", an additive that promotes even and reproducible deposition by increasing ionic strength and reducing interparticle electrostatic repulsion. Suitable screening agents include any low molecular weight salts such as halide salts, sulfate salts, nitrate salts, phosphate salts, fluorophosphate salts, and the like. Examples of halide salts include chloride salts such as LiCl, NaCl, KCl, $CaCl_2$, $MgCl_2$, $NH_4C_1$ and the like, bromide salts such as LiBr, NaBr, KBr, $CaBr_2$, $MgBr_2$, and the like, iodide salts such as LiI, NaI, KI, $CaI_2$, $MgI_2$, and the like, and fluoride salts such as, NaF, KF, and the like. Examples of sulfate salts include $Li_2SO_4$, $Na_2SO_4$, $K_2SO_4$, $(NH_4)_2SO_4$, $MgSO_4$, $CoSO_4$, $CuSO_4$, $ZnSO_4$, $Sr_5O_4$, $Al_2(SO_4)_3$, and $Fe_2(SO_4)_3$. Organic salts such as $(CH_3)_3CCl$, $(C_2H_5)_3CCl$, and the like are also suitable screening agents.

Suitable screening agent concentrations can vary with the ionic strength of the salt. In some embodiments, the aqueous solution comprises (e.g. NaCl) screening agent at a concentration ranging from 0.01 M to 0.1M. The absorptive regions may contain trace amounts of screening agent.

After applying and drying the light absorbing coating to the (e.g. entire) surface of the microstructured film, the light absorbing coating is then removed from the top portions of the transmissive (e.g. protrusions) regions and also removed from the land regions, between the transmissive (e.g. protrusions) regions. It is appreciated that the LCF can have improved on-axis transmission (e.g. brightness) even when some of the light absorbing coating is retained.

Any suitable method can be used to selectively remove the light absorbing material from the top surface of the protrusions (e.g. light absorbing regions) and bottom surface of the channels.

In one embodiment, the light absorbing material is removed by reactive ion etching. Reactive ion etching (RIE) is a directional etching process utilizing ion bombardment to remove material. RIE systems are used to remove organic or inorganic material by etching surfaces orthogonal to the direction of the ion bombardment. The most notable difference between reactive ion etching and isotropic plasma etching is the etch direction. Reactive ion etching is characterized by a ratio of the vertical etch rate to the lateral etch rate which is greater than 1. Systems for reactive ion etching are built around a durable vacuum chamber. Before beginning the etching process, the chamber is evacuated to a base pressure lower than 1 Torr, 100 mTorr, 20 mTorr, 10 mTorr, or 1 mTorr. An electrode holds the materials to be treated and is electrically isolated from the vacuum chamber. The electrode may be a rotatable electrode in a cylindrical shape. A counter electrode is also provided within the chamber and may be comprised of the vacuum reactor walls.

Gas comprising an etchant enters the chamber through a control valve. The process pressure is maintained by continuously evacuating chamber gases through a vacuum pump. The type of gas used varies depending on the etch process. Carbon tetrafluoride ($CF_4$), sulfur hexafluoride ($SF_6$), octafluoropropane ($C_3F_8$), fluoroform ($CHF_3$), boron trichloride ($BCl_3$), hydrogen bromide (HBr), chlorine, argon, and oxygen are commonly used for etching. RF power is applied to the electrode to generate a plasma. Samples can be conveyed on the electrode through plasma for a controlled time period to achieve a specified etch depth. Reactive ion etching is known in the art and further described in U.S. Pat. No. 8,460,568; incorporated herein by reference.

In some embodiments, the step of reactive ion etching results in the absorptive regions being narrower (less than the average width) near the bottom surface 511 of the channels. Removing the light absorbing material can result in a (e.g. slight) increase in the depth of the channels.

After removing the light absorbing coating from the bottom surface of the channels, the channels can be filled with a low refractive index organic polymeric material that is light transmissive. In some embodiments, the organic polymeric material is a polymerizable resin composition and the method further comprising (e.g. radiation) curing the polymerizable resin. The polymerizable resin used in the manufacture of the microstructured film has a higher refractive index than the resin utilized for filling the channels. In some embodiments, the refractive index of the low refractive index polymerizable resin is 1.47 to 1.55.

The polymerizable resin can comprise a combination of a first and second polymerizable component selected from (meth)acrylate monomers, (meth)acrylate oligomers, and mixtures thereof. As used herein, "monomer" or "oligomer" is any substance that can be converted into a polymer. The term "(meth)acrylate" refers to both acrylate and methacrylate compounds. In some cases, the polymerizable composition can comprise a (meth)acrylated urethane oligomer, (meth)acrylated epoxy oligomer, (meth)acrylated polyester oligomer, a (meth)acrylated phenolic oligomer, a (meth) acrylated acrylic oligomer, and mixtures thereof.

The polymerizable resin can be a radiation curable polymeric resin, such as a UV curable resin. In some cases, polymerizable resin compositions useful for the LCF of the present invention can include polymerizable resin compositions such as are described in U.S. Pat. No. 8,012,567 (Gaides et al.), to the extent that those compositions satisfy the index and absorption characteristics herein described.

When the channels are filled with a cured polymerizable resin, the light control film may optionally include cover film 470 bonded to the microstructured film with adhesive 410, as illustrated in FIG. 4. When the channels are filled with air, the adhesive film and cover film are typically included.

In yet another embodiment, layer 410 may be a topcoat rather than adhesive. In this embodiment, cover film 470 may not be present.

LCF can further include an optional cover film that can be the same, or different than, base layer. Optional cover film can be bonded to the microstructured surface with an adhesive. Adhesive can be any optically clear adhesive, such as a UV-curable acrylate adhesive, a transfer adhesive, and the like.

The LCF may further comprise other coatings typically provided on the exposed surface.

Various hardcoats, antiglare coatings, antireflective coatings, antistatic, and anti-soiling coatings are known in the art. See for example U.S. Pat. Nos. 7,267,850; 7,173,778, PCT Publication Nos. WO2006/102383, WO2006/025992, WO2006/025956 and U.S. Pat. No. 7,575,847.

Figure 6:
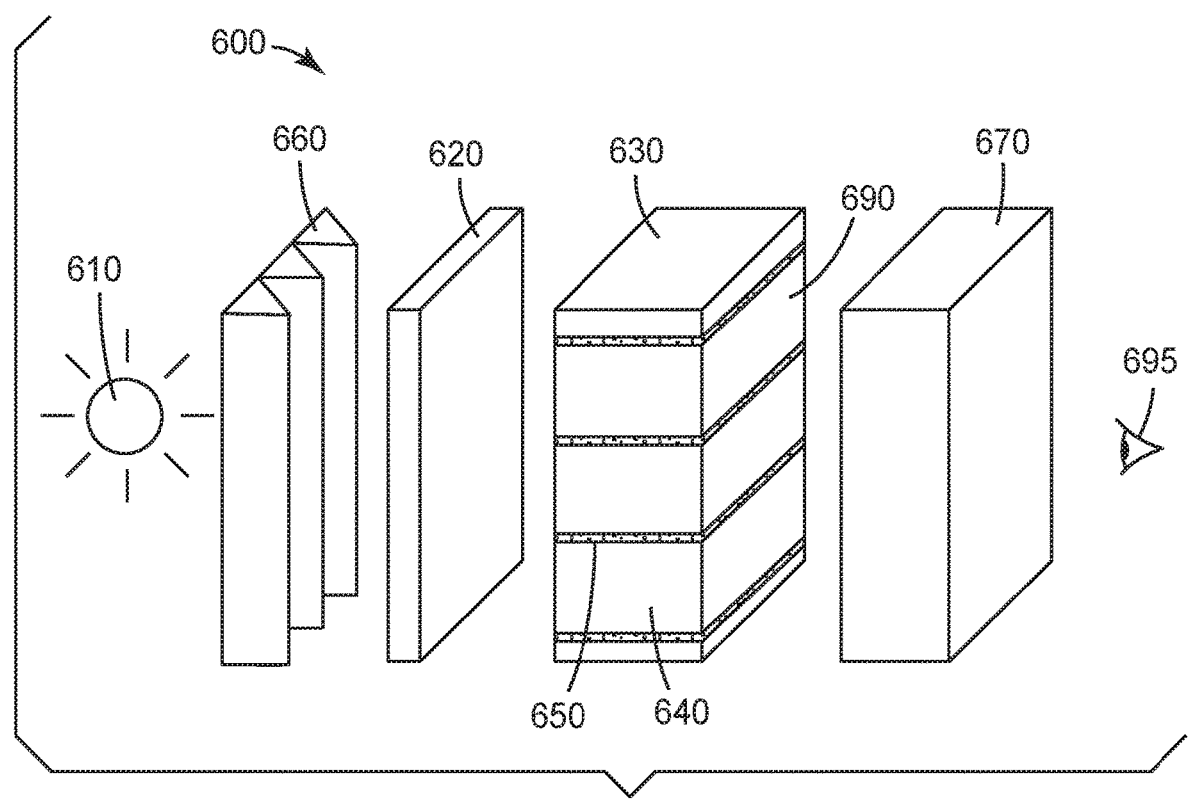
FIG. 6 is a perspective schematic of a backlit display comprising an embodied light control film.

FIG. 6 shows a perspective schematic of a backlit display 700 according to one embodiment. Backlit display 700 includes an LCF 730 comprising transmissive regions 740 and absorptive regions 7550 as previously described. Such LCF has a polar cut-off viewing angle θP, as previously described, of light leaving an output surface 790 of LCF 7530. Backlit display 700 includes a light source 710 configured to transmit light through LCF 730, through an image plane 720, such as an LCD panel, and on to a viewer 795. The viewing angle at which the brightness is a maximum, can depend on the polar cut-off viewing angle as previously described.

Backlit display 700 can also include an optional brightness enhancement film 760 and a reflective polarizer film 770 to further improve the brightness and uniformity of the display. Brightness enhancement film can be a prism film, such as 3M™ Brightness Enhancement Film "BEF" or Thin Brightness Enhancement Film "TBEF", available from 3M Company. Reflective polarizer film 570 can be a multilayer optical film, such as 3M™ Dual Brightness Enhancement Film "DBEF", available from 3M Company, St. Paul, Minn. Brightness enhancement film 760 and reflective polarizer film 770, if included, can be positioned as shown in FIG. 7.

In other embodiments, the light control film comprising transmissive regions and absorptive regions, as previously described, can be bonded to an emissive (e.g. an organic light emitting diode, or OLED) display.

In some embodiments, the LCF described herein (i.e. a first LCF) can be combined with a second LCF. In some embodiments, the second LCF may be a LCF (e.g. privacy film) such described in U.S. Pat. Nos. 6,398,370; 8,013,567; 8,213,082; and 9,335,449. In other embodiments, the second LCF is an LCF as described herein (e.g. wherein the light absorbing regions have an aspect ratio of at least 30). The first and second LCFs can be stacked in various orientations.

In one embodiment, the first and second light control films are positioned such that the absorptive regions of the first LCF are parallel and typically coincident with the absorptive regions of the second LCF. In another embodiment, the first and second light control films are positioned such that the absorptive regions of the first LCF are orthogonal with the absorptive regions of the second LCF. The first and second light control films can also be positioned such that the absorptive regions range from being parallel to orthogonal with each other at a viewing angle of 0 degrees.

In some embodiments, the combination of first and second LCF has a relative transmission (e.g. brightness) of at least 60, 65, 70, 75, 80, 85, or 90% at a viewing angle of 0 degrees. In some embodiments, the relative transmission (e.g. brightness) at a viewing angle of +30 degrees, −30 degrees, or the average of +30 and −30 degrees is less than 25, 20, 15, 10, or 5%. In some embodiments, the average relative transmission (e.g. brightness) for viewing angles ranging from +35 to +80 degrees, −35 degrees to −85 degrees, or the average of these ranges is less than 10, 9, 8, 7, 6, 5, 4, 3, 2, or 1%.

In some embodiments, this combination of LCF has a relative transmission (e.g. brightness) of at least 60, 65, 70, 75, 80, 85, or 90% at a viewing angle of 0 degrees. In some embodiments, the relative transmission (e.g. brightness) at a viewing angle of +30 degrees, −30 degrees, or the average of +30 and −30 degrees is less than 25, 20, 15, 10, or 5%.

The light control films described herein are particularly useful as a component of a display device as a so-called hybrid privacy filter. The hybrid privacy filter may be used in conjunction with a display surface, wherein light enters the hybrid privacy filter on the input side of the light control film and exits the hybrid privacy filter or film stack at the color shifting film. A great number of electronic devices with displays may be used in conjunction with the present invention including laptop monitors, external computer monitors, cell phone displays, televisions, smart phones, automotive center information displays, automotive driver information displays, automotive side mirror displays (also referred to as e-mirrors), consoles, or any other similar LCD, OLED, micro-LED, or mini-LED based display. An additional benefit to applying hybrid privacy filters to a display is for contrast enhancement.

Other types of backlit display imaging devices are also contemplated, including non-electronic displays such as sunglasses, document coversheets, console switches in auto and aviation applications, airplane cockpit controls, helicopter cockpit controls, windows and any number of others.

In further embodiments, the light control film stacks described herein may be useful as coverings for glass. For instance, the film stacks may be laminated onto or within fenestrations. The fenestrations may be selected from a glass panel, a window, a door, a wall, and a skylight unit. These fenestrations may be located on the outside of a building or on the interior. They may also be car windows, train windows, airplane passenger windows, or the like. Advantages of incorporating these film stacks into fenestrations include reduced IR transmission (which may lead to increased energy savings), ambient light blocking, privacy, and decorative effects.

The present description should not be considered limited to the particular examples described herein, but rather should be understood to cover all aspects of the description as fairly set out in the attached claims. Various modifications, equivalent processes, as well as numerous structures to which the present description can be applicable will be readily apparent to those of skill in the art to which the present description is directed upon review of the instant specification. The foregoing description can be better understood by Examples Objects and advantages of this invention are further illustrated by the following examples, but the particular materials and amounts thereof recited in these examples, as well as other conditions and details, should not be construed to unduly limit this invention.

Ray-Trace Modeling of LCF

The performance of the LCF was modeled using an optical raytrace program. The optical raytrace program provides results comparable to public commercial raytrace software, such as TracePro® (available from Lambda Research Corp., Littleton, Mass.), and LightTools® (available from Optical Research Associates, Pasadena, Calif.).

Optical Values:

| Examples | Base resin index | Backfill resin index |
|---|---|---|
| Base case (no TIR) | 1.5518 | 1.518 |
| Invention (Asymmetric Cladding) | 1.62 | 1.518 |

| | LbL Core | | | TIR Clad | | | AR Clad | | |
|---|---|---|---|---|---|---|---|---|---|
| Examples | n | k | Thickness (nm) | n | k | Thickness (nm) | n | k | Thickness (nm) |
| Base case (no TIR) | 1.87 | 0.249 | 550 | 1.556 | 0.019 | 300 | 1.556 | 0.019 | 300 |
| Invention (Asymmetric Cladding) | 1.87 | 0.249 | 550 | 1.556 | 0.007 | 550 | 1.556 | 0.019 | 300 |

Results:

| Angle (deg) | Base Case % T | Top Hat % T | % Increase in Brightness |
|---|---|---|---|
| 0 | 90 | 95 | 5.56% |
| 10 | 70 | 87 | 24.29% |
| 15 | 55 | 73 | 32.73% |
| 20 | 37 | 55 | 48.65% |
| 25 | 17 | 30 | 76.47% |

The complete disclosures of the publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A light control film comprising:
   a light input surface and a light output surface opposite the light input surface;
   alternating transmissive regions and absorptive regions disposed between the light input surface and the light output surface; and
   TIR cladding layers, the TIR cladding layer having a refractive index, $n_{TIR}$, and an extinction coefficient, $K_{TIR}$;
   wherein the transmissive regions alternate between high refractive index transmissive regions having a refractive index, $n_2$, and low refractive index transmissive regions having a refractive index, $n_1$,
   wherein the absorptive regions comprise a core having a refractive index, ncore, and an extinction coefficient, $k_{core}$, adjacent an AR cladding layer, the AR cladding layer having a refractive index, $n_{AR}$, and an extinction coefficient, $K_{AR}$;
   wherein $n_1 < n_2$;
   wherein $n_{TIR} < n_2$;
   wherein the TIR cladding layers are adjacent the high refractive index transmissive regions;
   wherein the cores have an aspect ratio of at least 20; and
   wherein the high refractive index transmissive regions have a wall angle of 6 degrees or less.

2. The light control film of claim 1 wherein $k_{TIR} < k_{core}$ and $K_{AR} < K_{core}$.

3. The light control film of claim 2 wherein $k_{TIR} < K_{AR}$.

4. The light control film of claim 1 wherein the cores, TIR cladding layers and AR cladding layers comprise light absorbing particles.

5. The light control film of claim 4 wherein the light absorbing particles comprise carbon black.

6. The light control film of claim 1 wherein $K_{TIR}$ is 0 to 0.1.

7. The light control film of claim 1 wherein $k_{AR}$ is 0.005 to 0.15.

8. The light control film of claim 1 wherein $K_{core}$ is 0.1 to 0.5.

9. A light control film comprising:
   a light input surface and a light output surface opposite the light input surface;
   alternating transmissive regions and absorptive regions disposed between the light input surface and the light output surface; and
   TIR cladding layers, the TIR cladding layer having a refractive index, $n_{TIR}$, and a concentration of light absorbing material, $C_{TIR}$;
   wherein the transmissive regions alternate between high refractive index transmissive regions having a refractive index, $n_2$, and low refractive index transmissive regions having a refractive index, $n_1$,
   wherein the absorptive regions comprise a core having a refractive index, $n_{core}$, and a concentration of light absorbing material, $C_{core}$, adjacent an AR cladding layer, the AR cladding layer having a refractive index, $n_{AR}$, and a concentration of light absorbing material, $C_{AR}$;

wherein $n_1 < n_2$;

wherein $n_{TIR} < n_2$;

wherein the TIR cladding layers are adjacent the high refractive index transmissive regions;

wherein the cores have an aspect ratio of at least 20; and wherein the high refractive index transmissive regions have a wall angle of 6 degrees or less.

10. The light control film of claim 9 wherein $C_{TIR} < C_{core}$ and $C_{AR} < C_{core}$.

11. The light control film of claim 10 wherein $C_{TIR} < C_{AR}$.

12. The light control film of claim 1 wherein the cores, TIR cladding layers and AR cladding layers comprise light absorbing particles.

13. The light control film of claim 12 wherein the light absorbing particles comprise carbon black.

14. The light control film of claim 9 wherein the TIR cladding layers comprise 0 wt. % to 40 wt. % of light absorbing material.

15. The light control film of claim 9 wherein the AR cladding layers comprise 25 wt. % to 45 wt. % of light absorbing material.

16. The light control film of claim 1 the cores comprise 30 wt. % to 100 wt. % of light absorbing material.

17. The light control film of claim 1 wherein $n_1$ is 1.47-1.55.

18. The light control film of claim 1 wherein $n_2$ is 1.6 to 1.7.

19. A method of making a light control film comprising:

providing a microstructured film comprising a plurality of high refractive index transmissive regions having a refractive index, $n_2$, alternated with channels, wherein the microstructured film has a surface defined by a top surface and side walls of the light transmissive regions and a bottom surface of the channels, wherein the side walls have a wall angle of 6 degrees or less;

applying a TIR layer of a light absorptive or transmissive cladding material having a refractive index, $n_{TIR}$, and an extinction coefficient, $K_{TIR}$, to the surface;

applying a layer of a light absorptive core material having a refractive index, $n_{core}$, and an extinction coefficient, $k_{core}$, on the TIR layer;

applying an AR layer of a light absorptive cladding material having a refractive index, $n_{AR}$, and an extinction coefficient, $k_{AR}$, on the layer of light absorptive core material;

removing at least a portion of the TIR layer, the layer of light absorptive core material and the AR layer from the top surface of the light transmissive regions and bottom surface of the channels; and filling the channels with a light transmissive organic polymeric material having a refractive index, $n_1$;

wherein $n_1 < n_2$ and $n_{TIR} < n_2$.

20. A method of making a light control film comprising:

providing a microstructured film comprising a plurality of high refractive index transmissive regions having a refractive index, $n_2$, alternated with channels, wherein the microstructured film has a surface defined by a top surface and side walls of the light transmissive regions and a bottom surface of the channels, wherein the side walls have a wall angle of 6 degrees or less;

applying a TIR layer of a light absorptive or transmissive cladding material having a refractive index, $n_{TIR}$, and a concentration of light absorbing material, $C_{TIR}$, to the surface;

applying a layer of a light absorptive core material having a refractive index, $n_{core}$, and a concentration of light absorbing material, $C_{core}$, on the TIR layer;

applying an AR layer of a light absorptive cladding material having a refractive index, $n_{AR}$, and a concentration of light absorbing material, $C_{AR}$, on the layer of light absorptive core material;

removing at least a portion of the TIR layer, the layer of light absorptive core material and the AR layer from the top surface of the light transmissive regions and bottom surface of the channels; and filling the channels with a light transmissive organic polymeric material having a refractive index, $n_1$;

wherein $n_1 < n_2$ and $n_{TIR} < n_2$.

* * * * *

UNITED STATES PATENT AND TRADEMARK OFFICE
CERTIFICATE OF CORRECTION

PATENT NO. : 12,313,864 B2
APPLICATION NO. : 17/757743
DATED : May 27, 2025
INVENTOR(S) : Tao Liu et al.

Page 1 of 1

It is certified that error appears in the above-identified patent and that said Letters Patent is hereby corrected as shown below:

In the Claims

Column 20

Line 3, In Claim 1, delete "extinction coefficient, $K_{TIR}$" and insert -- extinction coefficient, $k_{TIR}$ --, therefor.

Line 12, In Claim 1, delete "extinction coefficient, $K_{AR}$" and insert -- extinction coefficient, $k_{AR}$ --, therefor.

Line 36, In Claim 2, delete "$K_{AR} < K_{core}$" and insert -- $k_{AR} < k_{core}$ --, therefor.

Line 37, In Claim 3, delete "wherein $k_{TIR} < K_{AR}$" and insert -- wherein $k_{TIR} < k_{AR}$ --, therefor.

Line 43, In Claim 6, delete "wherein $K_{TIR}$" and insert -- wherein $k_{TIR}$ --, therefor.

Line 47, In Claim 8, delete "wherein $K_{core}$" and insert -- wherein $k_{core}$ --, therefor.

Column 21

Line 38, In Claim 19, delete "an extinction coefficient, $K_{TIR}$," and insert -- an extinction coefficient, $k_{TIR}$, --, therefor.

Signed and Sealed this
Second Day of December, 2025

John A. Squires
*Director of the United States Patent and Trademark Office*